United States Patent Office 3,004,074
Patented Oct. 10, 1961

3,004,074
CONDENSATION OF POLYHALOCYCLOALKADIENES WITH CYCLOOCTATETRAENE
Louis Schmerling, Riverside, Ill., assignor, by mesne assignments, to Universal Oil Products Company, Des Plaines, Ill., a corporation of Delaware
No Drawing. Filed Aug. 3, 1954, Ser. No. 447,655
13 Claims. (Cl. 260—648)

This invention relates to new compositions of matter prepared by condensing a polyhalocycloalkadiene with cyclooctatetraene, and more particularly to new compositions of matter prepared by condensing at least one molecule of hexachlorocyclopentadiene with cyclooctatetraene.

An object of this invention is to prepare new compositions of matter which are useful as insecticides.

A further object of this invention is to prepare new compositions of matter, useful as insecticides, by condensing a polyhalocycloalkadiene such as hexachlorocyclopentadiene with cyclooctatetraene.

One embodiment of this invention resides in a process for the preparation of a polyhalo substituted polycyclic compound by reacting at least one molecule of a polyhalocycloalkadiene with cyclooctatetraene, and recovering the resultant polyhalopolyhydromethanocyclooctabenzenes.

A specific embodiment of this invention resides in a process for preparing a hexachloro substituted polycyclic compound by condensing at least one molecule of hexachlorocyclopentadiene with cyclooctatetraene in the presence of an inert solvent, and recovering the resultant 1,2,3,4,11,11 - hexachloro - 1,4,4a,10a - tetrahydro - 1,4-methanocyclooctabenzene.

A still more specific embodiment of this invention resides in a process for preparing a hexachloro substituted polycyclic compound by condensing at least one molecule of hexachlorocyclopentadiene with cyclooctatetraene in the presence of toluene at a temperature in the range of from about 80° to about 140° C., and recovering the resultant 1,2,3,4,11,11 - hexachloro - 1,4,4a,10a - tetrahydro-1,4-methanocyclooctabenzene.

Yet another specific embodiment of this invention resides in a new composition of matter comprising 1,2,3,4,11,11 - hexachloro - 1,4,4a,10a - tetrahydro - 1,4-methanocyclooctabenzene.

Other objects and embodiments of this invention referring to alternative polyhalocycloalkadienes which may be used in the present process will be found in the following further detailed description of this invention.

It has now been discovered that new compositions of matter comprising adducts of cyclooctatetraene may be prepared by condensing at least one molecular proportion of polyhalocycloalkadiene with said cyclooctatetraene in the presence of an inert solvent. These new compositions of matter, particularly those which comprise the condensation products of hexachlorocyclopentadiene and cyclooctatetraene are useful as insecticides and as intermediates in the preparation of other organic compounds. The polyhalocycloalkadienes which are used in the process of this invention are selected from the polyhalocyclopentadienes and preferably comprises hexachlorocyclopentadiene or hexabromocyclopentadiene, although other chloro- or bromo-substituted cyclopentadienes such as dichlorocyclopentadiene, trichlorocyclopentadiene, tetrachlorocyclopentadiene, pentachlorocyclopentadiene, dibromocyclopentadiene, tribromocyclopentadiene, dibromotetrachlorocyclopentadiene, etc. may also be used, although not necessarily with equivalent results.

The product of the condensation of one molecular proportion of hexachlorocyclopentadiene with cyclooctatetraene comprises a tricyclic compound which is 1,2,3,4,11,11 -hexachloro - 1,4,4a,10a - tetrahydro - 1,4-methanocyclooctabenzene, and is shown in I.

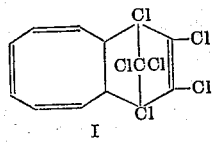

I

When two molecular proportions of hexachlorocyclopentadiene are condensed with one molecular proportion of cyclooctatetraene, the resulting product comprises 1,2,3,4,7,8,9,10,13,13,14,14 - dodecachloro - 1,4,4a,6a,7,-10,10a,12a - octahydro - 1,4,7,10 - dimethanocyclooctа [a.,e.] dibenzene which is shown in II.

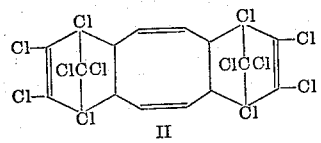

II

An isomer of II in which the hexachlorobicycloheptene rings are on the $a$ and $c$ sides of the cyclooctadiene ring, namely 1,2,3,4,5,6,7,8,13,13,14,14 - dodecachloro - 1,4,-4a,4b,5,8,8a,12a - octahydro - 1,4,5,8 - dimethanocyclo-octa [a.c] dibenzene may also be formed.

Likewise, the condensation of three molecular proportions of hexachlorocyclopentadiene with one molecular proportion of cyclooctatetraene and of four molecular proportions of hexachlorocyclopentadiene with one molecular proportion of cyclooctatetraene will result, respectively, in the compounds shown in III and IV.

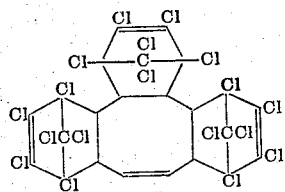

III

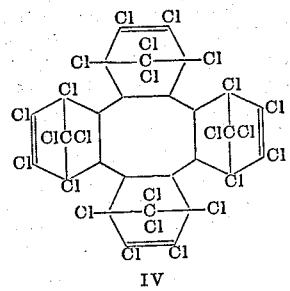

IV

Compounds I, II and its isomer, III and IV are examples of polychloropolyhydromethanocyclooctabenzenes.

It is also contemplated within the scope of this invention that alkyl substituted cyclooctatetraenes such as methylcyclooctatetraene, ethylcyclooctatetraene, propylcyclooctatetraene, dimethylcyclooctatetraene, trimethylcyclooctatetraene, etc. may be used as starting materials in the condensation process, although not necessarily with equivalent results.

The condensation reaction of this invention takes place at elevated temperatures, suitable temperatures lying in the range of from about 40° C. to about 200° C., the preferred range being from about 80° to about 140° C. In addition, the reaction may be carried out in the presence of an inert solvent such as toluene, benzene, ethyl alcohol, etc.

The process of the present invention may be effected in any suitable manner and may comprise either a batch or continuous type operation. When a batch type operation is used, a quantity of the starting materials, namely, the polyhalocycloalkadiene and the cyclooctatetraene along with an inert solvent, if so desired, are placed in an appropriate condensation apparatus containing mixing and heating means. The reaction vessel is heated to the desired temperature and maintained thereat for a predetermined period of time. At the end of the residence time which may be from about 0.5 to about 12 hours, the reaction vessel and the contents thereof is cooled to room temperature and the reaction product seperated from unreacted starting materials, unwanted side products and solvent by conventional means, such as fractional distillation, crystallization, etc.

The product of this invention may also be prepared by a continuous process wherein the reactants are continuously charged to a reaction vessel maintained at the proper operating conditions of temperature and pressure. After the desired residence time in the reactor, a product stream is continuously withdrawn therefrom. The withdrawn condensation product is separated from any unreacted starting materials and/or unwanted side reaction products which may have formed, and purified by conventional means, as hereinbefore set forth, while the unreacted compounds are recycled for further use as a portion of the feed material.

The physical properties of the present polycyclic condensation products and the effects they have on entomological forms of life make them particularly desirable as insecticides and insect repellants, the compounds having many of the features desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficient volatile such that when applied to plant life intended for subsequent human consumption, the plant when harvested and after allowing a reasonable time for evaporation of the applied insecticide therefrom retain none of the toxicant to prevent use of the plant for food purposes. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, Freon, etc., may be compressed and liquefied into a small bomb containing the insecticide. Upon release of pressure from the bomb, the liquified carrier vaporizes and suspends a quantity of the active component therein, thus providing a convenient spraying method of applying the insecticide. The active component may also be dissolved in a liquid carrier, such as kerosene, an alcohol, etc., and the resulting solution atomized by a suitable spraying device.

The following example is given to illustrate the process of the invention which, however, is not intended to limit the generally broad scope of the present invention in strict accordance therewith.

Example 1

5.5 g. of cyclooctatetraene and 14.5 g. of hexachlorocyclopentadiene along with 8 g. of toluene were placed in a condensation apparatus equipped with refluxing means. The apparatus was heated to a temperature of approximately 130° C. and the solution refluxed for a period of approximately 8 hours at that temperature. At the end of this time the reactor was cooled to room temperature and the reaction product which consisted of a dark amber solution was subjected to fractional distillation at reduced pressure. After the removal of the toluene and the unreacted starting materials there was obtained 8.5 g. of a solid product melting above 300° C.

I claim as my invention:

1. A process for the preparation of a polyhalo substituted polycyclic compound which comprises reacting at least one molecular proportion of polyhalocyclopentadiene with cyclooctatetraene, and recovering the resultant polyhalopolyhydromethanocyclooctabenzenes.

2. A process for the preparation of a polyhalo substituted polycyclic compound which comprises reacting at least one molecular proportion of polyhalocyclopentadiene with cyclooctatetraene in the presence of an inert solvent, and recovering the resultant polyhalopolyhydromethanocyclooctabenzenes.

3. A process for the preparation of a polyhalo substituted polycyclic compound which comprises reacting at least one molecular proportion of polyhalocyclopentadiene with cyclooctatetraene in the presence of toluene, and recovering the resultant polyhalopolyhydromethanocyclooctabenzenes.

4. A process for the preparation of a polychloro substituted polycyclic compound which comprises reacting at least one molecular proportion of polychlorocyclopentadiene with cyclooctatetraene in the presence of toluene, and recovering the resultant polychloropolyhydromethanocyclooctabenzenes.

5. A process for the preparation of a polybromo substituted polycyclic compound which comprises reacting at least one molecular proportion of polybromocyclopentadiene with cyclooctatetraene in the presence of toluene, and recovering the resultant polybromopolyhydromethanocyclooctabenzenes.

6. A process for the preparation of a hexachloro substituted polycyclic compound which comprises reacting at least one molecular proportion of hexachlorocyclopentadiene with cyclooctatetraene in the presence of an inert solvent, and recovering the resultant 1,2,3,4,11,11-hexachloro - 1,4,4a,10a - tetrahydro - 1,4 - methanocyclooctabenzene.

7. A process for the preparation of a dodecachloro substituted polycyclic compound which comprises reacting two molecular proportions of hexachlorocyclopentadiene with cyclooctatetraene in the presence of an inert solvent, and recovering the resultant 1,2,3,4,7,8,9,10,13,13,14,14-dodecachloro - 1,4,4a,6a,7,10,10a - octahydro - 1,4,7,10-dimethanocycloocta [a,e] dibenzene.

8. A process for the preparation of a hexachloro substituted polycyclic compound which comprises reacting at least one molecular proportion of hexachlorocyclopentadiene with cyclooctatetraene in the presence of an inert solvent at a temperature in the range of from about 40° to about 200° C., and recovering the resultant polychloropolyhydromethanocyclooctabenzenes.

9. A process for the preparation of a hexachloro substituted polycyclic compound which comprises reacting at least one molecular proportion of hexachlorocyclopentadiene with cyclooctatetraene in the presence of an inert solvent at a temperature in the range of from about 40° to 200° C., and recovering the resultant 1,2,3,4,11,11-hexachloro - 1,4,4a,10a - tetrahydro - 1,4 - methanocyclooctabenzene.

10. Polyhalopolyhydromethanocyclooctabenzene.

11. Polychloropolyhydromethanocyclooctabenzene.

12. The compound 1,2,3,4,11,11-hexachloro-1,4,4a,10a-tetrahydro-1,4-methanocyclooctabenzene.

13. The compound 1,2,3,4,7,8,9,10,13,13,14,14-dodecachloro - 1,4,4a,6a,7,10,10a - octahydro - 1,4,7,10-dimethanocycloocta [a,e] dibenzene.

References Cited in the file of this patent

UNITED STATES PATENTS

| | | |
|---|---|---|
| 2,606,910 | Herzfeld et al. | Aug. 12, 1952 |
| 2,635,979 | Lidow | Apr. 21, 1953 |
| 2,658,926 | Hyman et al. | Nov. 10, 1953 |